United States Patent
Saito et al.

(10) Patent No.: US 10,870,436 B2
(45) Date of Patent: Dec. 22, 2020

(54) OPERATION ASSISTANCE SYSTEM AND OPERATION ASSISTANCE METHOD

(71) Applicant: HONDA MOTOR CO., LTD., Tokyo (JP)

(72) Inventors: Kota Saito, Wako (JP); Yoshihiro Matsugi, Wako (JP); Yuki Matsuura, Wako (JP); Seungho Choi, Wako (JP); Yoshikazu Matsuo, Wako (JP); Hiromi Sato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/519,549

(22) Filed: Jul. 23, 2019

(65) Prior Publication Data
US 2020/0031369 A1 Jan. 30, 2020

(30) Foreign Application Priority Data

Jul. 24, 2018 (JP) .................................. 2018-138155

(51) Int. Cl.
*B60W 50/14* (2020.01)
*B60W 50/10* (2012.01)
*G06K 9/00* (2006.01)
*G06T 7/20* (2017.01)

(52) U.S. Cl.
CPC ............ *B60W 50/14* (2013.01); *B60W 50/10* (2013.01); *G06K 9/00355* (2013.01); *G06K 9/00845* (2013.01); *G06T 7/20* (2013.01); *B60W 2050/143* (2013.01); *B60W 2050/146* (2013.01)

(58) Field of Classification Search
CPC ................. B60W 50/14; B60W 50/10; B60W 2050/146; B60W 2050/143; G06K 9/00355; G06K 9/00845; G06K 9/4642; G06T 7/20; G06F 3/013; G06F 3/017; G06F 21/00; G06F 3/01
See application file for complete search history.

(56) References Cited

U.S. PATENT DOCUMENTS

| | | | |
|---|---|---|---|
| 2014/0254870 A1 | 9/2014 | Tsukamoto et al. | |
| 2014/0309862 A1* | 10/2014 | Ricci | B60R 25/1004 701/36 |
| 2014/0309871 A1* | 10/2014 | Ricci | B60R 25/00 701/36 |
| 2016/0357262 A1* | 12/2016 | Ansari | G06Q 10/0833 |

FOREIGN PATENT DOCUMENTS

| | | |
|---|---|---|
| JP | 2008-257363 A | 10/2008 |
| JP | 2014-174776 A | 9/2014 |

* cited by examiner

*Primary Examiner* — Brian Wilson
(74) *Attorney, Agent, or Firm* — Carrier Blackman & Associates, P.C.; Joseph P. Carrier; William D. Blackman (57) ABSTRACT

An operation assistance system includes: a motion recognition unit that recognizes predetermined motion of a hand of a vehicle occupant; a position recognition unit that recognizes a first relative position corresponding to a relative position of the hand of the vehicle occupant with respect to a first vehicle; a specifying unit that specifies a second on-vehicle device of a second vehicle that is operated by using an operation unit of the second vehicle provided at a second relative position that is a relative position with respect to the second vehicle and corresponds to the first relative position; and a control unit that assists an operation for a first on-vehicle device of the first vehicle, the first on-vehicle device including a function common with that of the second on-vehicle device.

6 Claims, 7 Drawing Sheets

| IDENTIFICATION NUMBER 68 | VEHICLE TYPE INFORMATION 80 | | | | AIR CONDITIONER GETTING-IN INFORMATION 84 | ON-VEHICLE DEVICE INFORMATION 76 | | | |
|---|---|---|---|---|---|---|---|---|---|
| | MANUFACTURER INFORMATION | MANUFACTURING COUNTRY INFORMATION 82 | VEHICLE MODEL INFORMATION 74 | | | DEVICE TYPE INFORMATION 86 | POSITIONAL INFORMATION 88 | DEVICE TYPE INFORMATION 86 | POSITIONAL INFORMATION 88 |
| aaaa | M1 | C1 | T1 | | PRESENT, YMD, N TIMES | | VX1-HY1 | HAZARD LAMP | VX2-HY2 |
| | M1 | C1 | T1 | | PRESENT, YMD, N TIMES | | VX3-HY3 | HAZARD LAMP | VX4-HY4 |
| bbbb | M2 | C2 | T2 | | NONE | | VX5-HY5 | HAZARD LAMP | VX6-HY6 |
| ... | ... | ... | ... | | ... | ... | ... | ... | ... |
| ... | ... | ... | ... | | ... | ... | ... | ... | ... |
| ... | ... | ... | ... | | ... | ... | ... | ... | ... |

FIG. 7B

OPERATION ASSISTANCE SYSTEM AND OPERATION ASSISTANCE METHOD

CROSS-REFERENCE TO RELATED APPLICATION

This application is based upon and claims the benefit of priority from Japanese Patent Application No. 2018-138155 filed on Jul. 24, 2018, the contents of which are incorporated herein by reference.

BACKGROUND OF THE INVENTION

Field of the Invention

The present invention relates to an operation assistance system and an operation assistance method for assisting an operation for an on-vehicle device of a first vehicle.

Description of the Related Art

Japanese Laid-Open Patent Publication No. 2008-257363 discloses an operation assistance device that assists an operation of an occupant in a vehicle (operator) for an on-vehicle device. If it is determined that the vehicle occupant is confused about an operation, this operation assistance device detects the on-vehicle device to be operated on the basis of a direction of the vehicle occupant's line of sight or a position of the vehicle occupant's hand or finger, and outputs operation assistance information about the on-vehicle device by a voice sound output device or a display device.

SUMMARY OF THE INVENTION

In a case where the vehicle occupant operates the on-vehicle device, if the vehicle occupant, who has been (gotten) in a host vehicle, misunderstands that he/she is in another vehicle, the vehicle occupant may reach the hand out to a position where a switch exists in the other vehicle in order to operate the switch. If the switch does not exist at the position in the host vehicle, the vehicle occupant is confused about the operation of the switch. The device disclosed in Japanese Laid-Open Patent Publication No. 2008-257363 cannot detect the on-vehicle device to be operated in a case where the switch does not exist in the direction of the vehicle occupant's line of sight or at the position of the vehicle occupant's hand or finger.

The present invention has been made in view of the above problem, and an object is to provide an operation assistance system and an operation assistance method for assisting an operation for an on-vehicle device appropriately when a vehicle occupant is confused about the operation of a switch.

A first aspect of the present invention is an operation assistance system configured to assist an operation for a first on-vehicle device of a first vehicle, and the operation assistance system includes: a motion recognition unit configured to recognize a predetermined motion of a hand of a vehicle occupant in the first vehicle; a position recognition unit configured to recognize a first relative position corresponding to a relative position of the hand of the vehicle occupant with respect to the first vehicle; a recording unit configured to record a relative position of an operation unit of a second vehicle with respect to the second vehicle, and a second on-vehicle device of the second vehicle that is operated by using the operation unit, while associating the relative position with the second on-vehicle device; a specifying unit configured to specify the second on-vehicle device of the second vehicle that is operated by using the operation unit of the second vehicle provided at a second relative position on a basis of a record in the recording unit, the second relative position being a relative position with respect to the second vehicle and corresponding to the first relative position; and a control unit configured to assist the operation for the first on-vehicle device of the first vehicle, the first on-vehicle device including a function common with that of the second on-vehicle device.

A second aspect of the present invention is an operation assistance method for assisting an operation for a first on-vehicle device of a first vehicle, and the operation assistance method includes: a step of, by a recording unit, recording a relative position of an operation unit of a second vehicle with respect to the second vehicle, and a second on-vehicle device of the second vehicle that is operated by using the operation unit, while associating the relative position with the second on-vehicle device; a motion recognition step of, by a calculation unit, recognizing a predetermined motion of a hand of a vehicle occupant in the first vehicle; a position recognition step of, by the calculation unit, recognizing a first relative position corresponding to a relative position of the hand of the vehicle occupant with respect to the first vehicle; a specifying step of, by the calculation unit, specifying the second on-vehicle device of the second vehicle that is operated by using the operation unit of the second vehicle provided at a second relative position, on a basis of a record in the recording unit, the second relative position being a relative position with respect to the second vehicle and corresponding to the first relative position; and a control step of, by the calculation unit, assisting the operation for the first on-vehicle device of the first vehicle, the first on-vehicle device including a function common with that of the second on-vehicle device.

By the present invention, the operation for the on-vehicle device can be assisted appropriately when the vehicle occupant is confused about the operation of a switch.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of an operation assistance system and an operation assistance method according to the present invention is described in detail with reference to the attached drawings.

[1. Configuration of Operation Assistance System 200]

Figure 1:
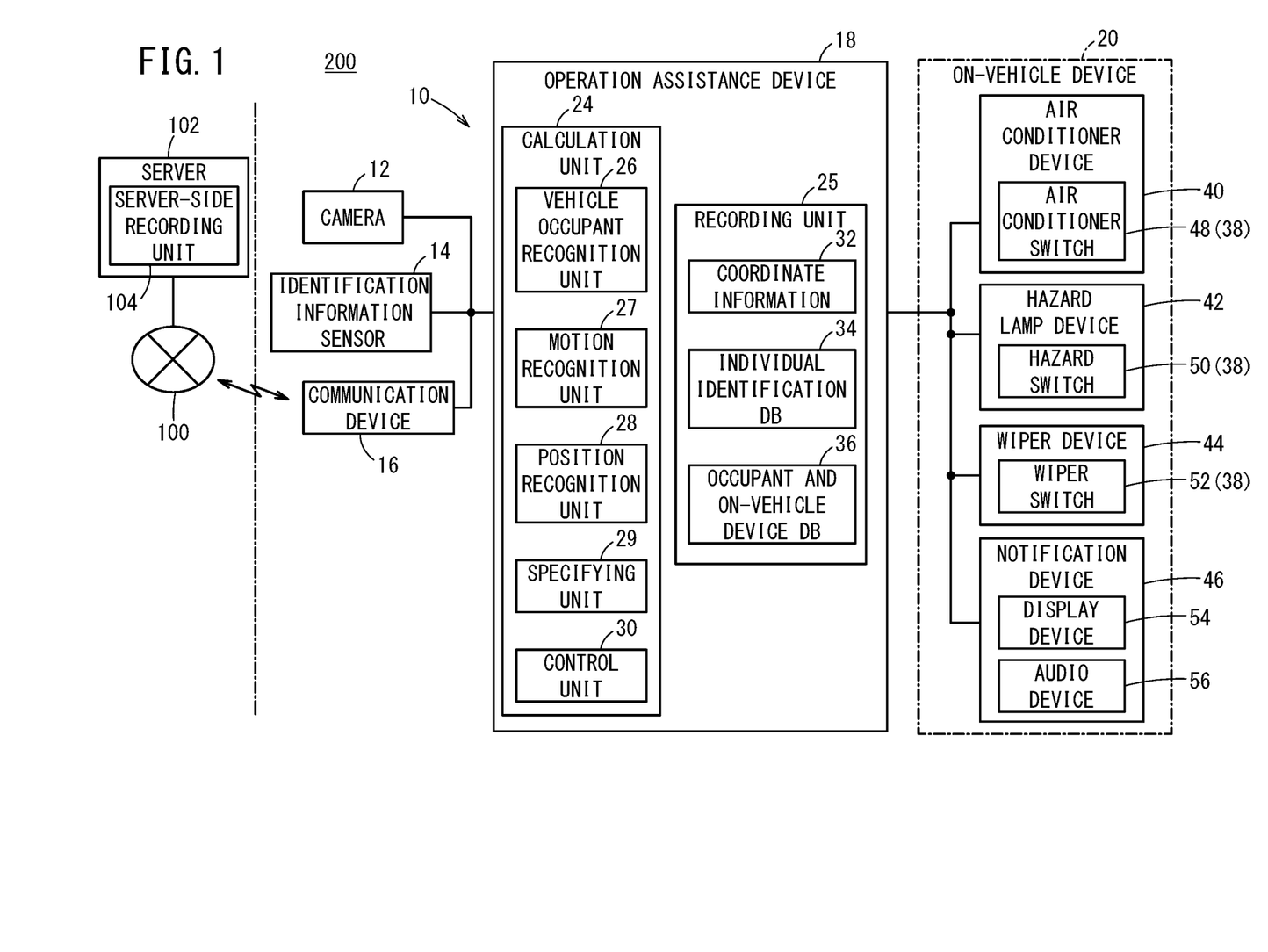
FIG. 1 is a configuration diagram of an operation assistance system according to one embodiment.

As illustrated in FIG. 1, an operation assistance system 200 includes a first vehicle 10 and a server 102.

[1.1. First Vehicle 10]

Figure 7A:
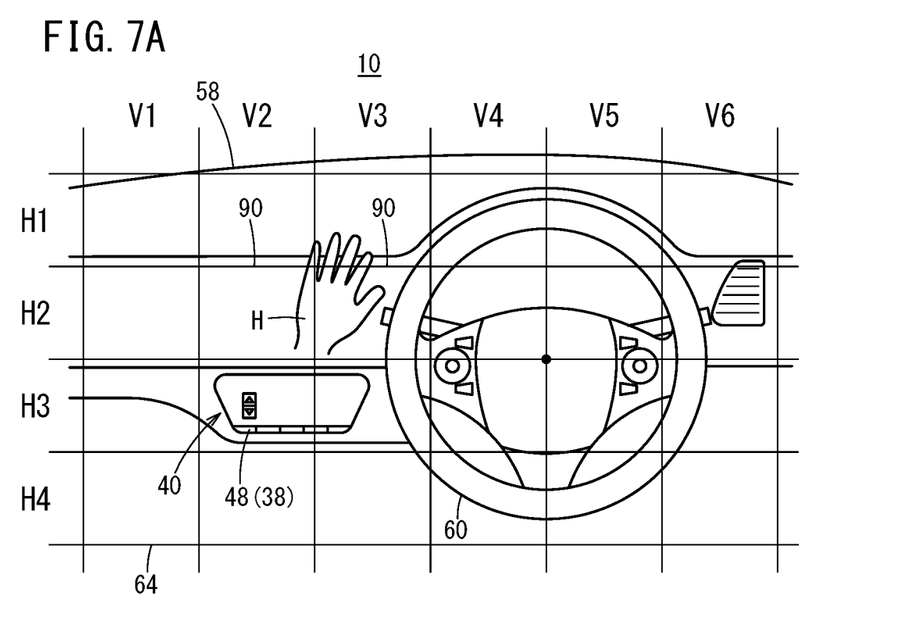
FIG. 7A illustrates the relative position in a first vehicle.
Figure 7B:
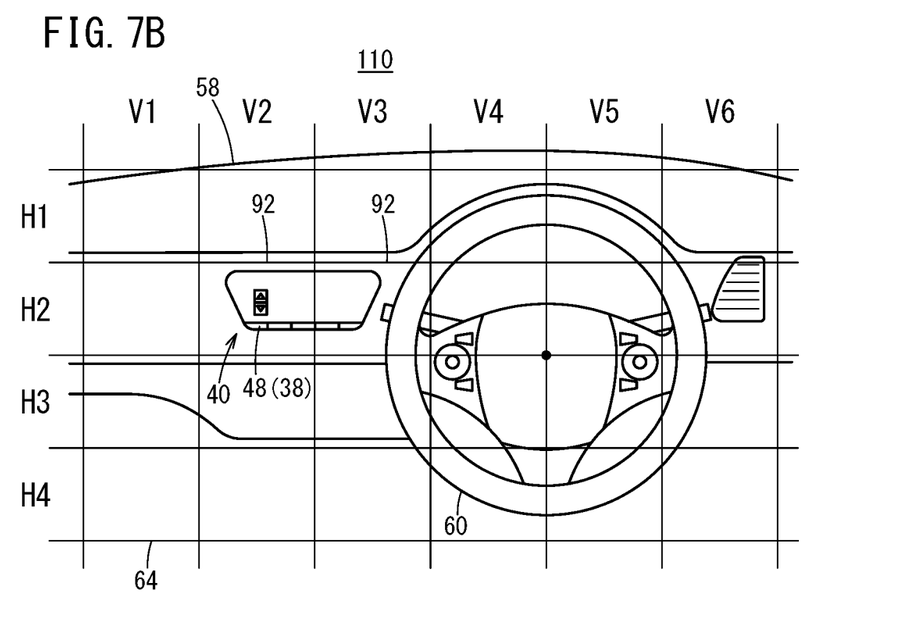
FIG. 7B illustrates the relative position in a second vehicle.

A configuration of the first vehicle 10 is described with reference to FIG. 1. In the present specification, a host vehicle to be mainly described is referred to as the first vehicle 10, and a vehicle occupant gets in the first vehicle 10. A vehicle other than the host vehicle is referred to as a second vehicle 110 (FIG. 7B). In the following description, it is assumed that the first vehicle 10 is a vehicle that is used in a mode where there are a plurality of vehicle occupants and a plurality of vehicles, for example, vehicles used as rental cars or in car sharing services, company-owned vehicles, public vehicles, and the like.

Figure 2:
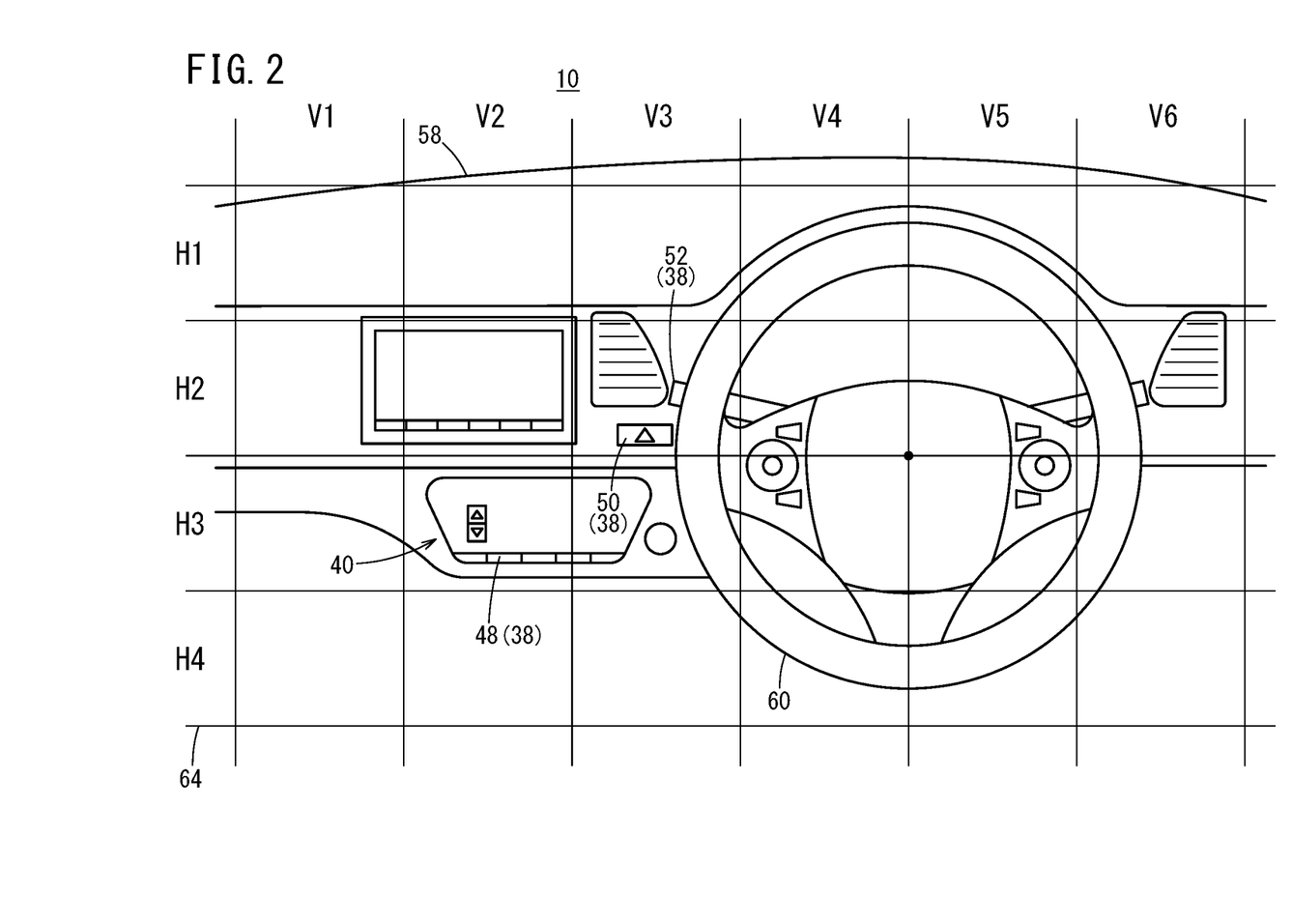
FIG. 2 is a diagram for describing a relative position.

The first vehicle 10 includes a camera 12, an identification information sensor 14, a communication device 16, an operation assistance device 18, and various on-vehicle devices 20. As illustrated in FIG. 2, a dashboard 58 and a steering wheel 60 of the first vehicle 10 are provided with various operation units 38 to control the on-vehicle device 20. The operation unit 38 includes switches such as a button and a lever.

The camera 12 is provided at a position from which a predetermined area including one or more operation units 38 and the periphery of the operation units 38 can be photographed, for example, on a ceiling. If the operation units 38 exist in a vehicle room of the first vehicle 10, a single camera 12 may photograph the operation units 38 or a plurality of cameras 12 may photograph each of the operation units 38 individually. The camera 12 photographs the operation unit 38 and the periphery of the operation unit 38 so as to acquire image information. Then, the camera 12 outputs the acquired image information to the operation assistance device 18.

The identification information sensor 14 detects information to identify the vehicle occupant (hereinafter, referred to as identification information 70 (FIG. 3)). The identification information sensor 14 is a biological information sensor that detects biological information 70a (FIG. 3) of the vehicle occupant, an input device for a secret code number 70b (FIG. 3) that is input by the vehicle occupant, or the like. As the biological information sensor, at least one sensor that detects the biological information 70a regarding a face, an eye, a blood vessel, a fingerprint, a palm, or voice of the vehicle occupant is provided. The identification information sensor 14 outputs the identification information 70 to the operation assistance device 18.

The communication device 16 includes a communication circuit, an antenna, and the like, performs data communication with the server 102 through a communication channel 100, and performs the data communication with the operation assistance device 18 through a communication line in the first vehicle 10.

The operation assistance device 18 is an electronic control unit (ECU) that includes a calculation unit 24, a recording unit 25, an input/output interface (not shown), and the like. The calculation unit 24 includes a processor including a CPU and the like, and achieves various functions when the processor executes programs recorded in the recording unit 25. In the present embodiment, the calculation unit 24 functions as a vehicle occupant recognition unit 26, a motion recognition unit 27, a position recognition unit 28, a specifying unit 29, and a control unit 30. Various functions will be described in the paragraph [2. Operation of Operation Assistance Device 18] below.

The recording unit 25 includes a memory such as a ROM and a RAM. The recording unit 25 records coordinate information 32, an individual identification database 34 (hereinafter, referred to as the individual identification DB 34), and an occupant and on-vehicle device database 36 (hereinafter, referred to as the occupant and on-vehicle device DB 36).

As illustrated in FIG. 2, the front of the dashboard 58 and the steering wheel 60 is used as a coordinate plane 64, and the coordinate information 32 defines a relative position in the coordinate plane 64. In the present embodiment, the origin of the coordinate plane 64 is the center position of the steering wheel 60, and coordinate axes thereof are a straight line that extends in a vertical (up-down) direction of the vehicle and a straight line that extends in a horizontal (width) direction of the vehicle. Moreover, in the present embodiment, the coordinate plane 64 is sectioned at predetermined intervals in the vertical direction and the horizontal direction. A position of each square is expressed by a coordinate position Vn in the vertical direction and a coordinate position Hn in the horizontal direction. The coordinate position Vn-Hn of each square is the relative position in a case where the center position of the steering wheel 60 is a reference position. The coordinate plane 64 is used commonly in both the first vehicle 10 and the second vehicle 110.

Figure 3:
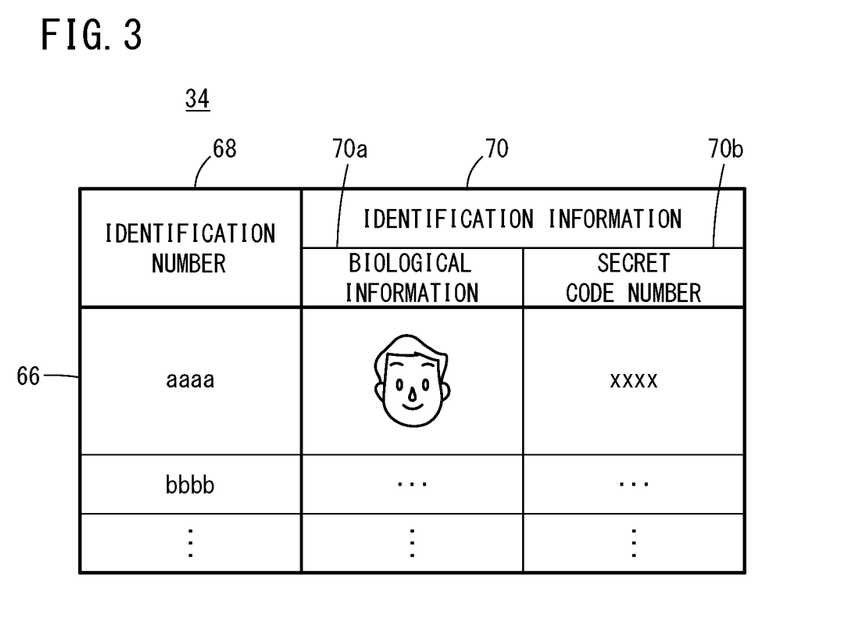
FIG. 3 illustrates personal information stored in an individual identification DB.

The individual identification DB 34 stores personal information 66 that is shown in FIG. 3. The personal information 66 associates (or links) an identification number 68 of the vehicle occupant with the identification information 70 of the vehicle occupant. As described above, the identification information 70 is the information to identify the vehicle occupant, for example, the information that expresses at least one of the biological information 70a and the secret code number 70b.

Figure 4:
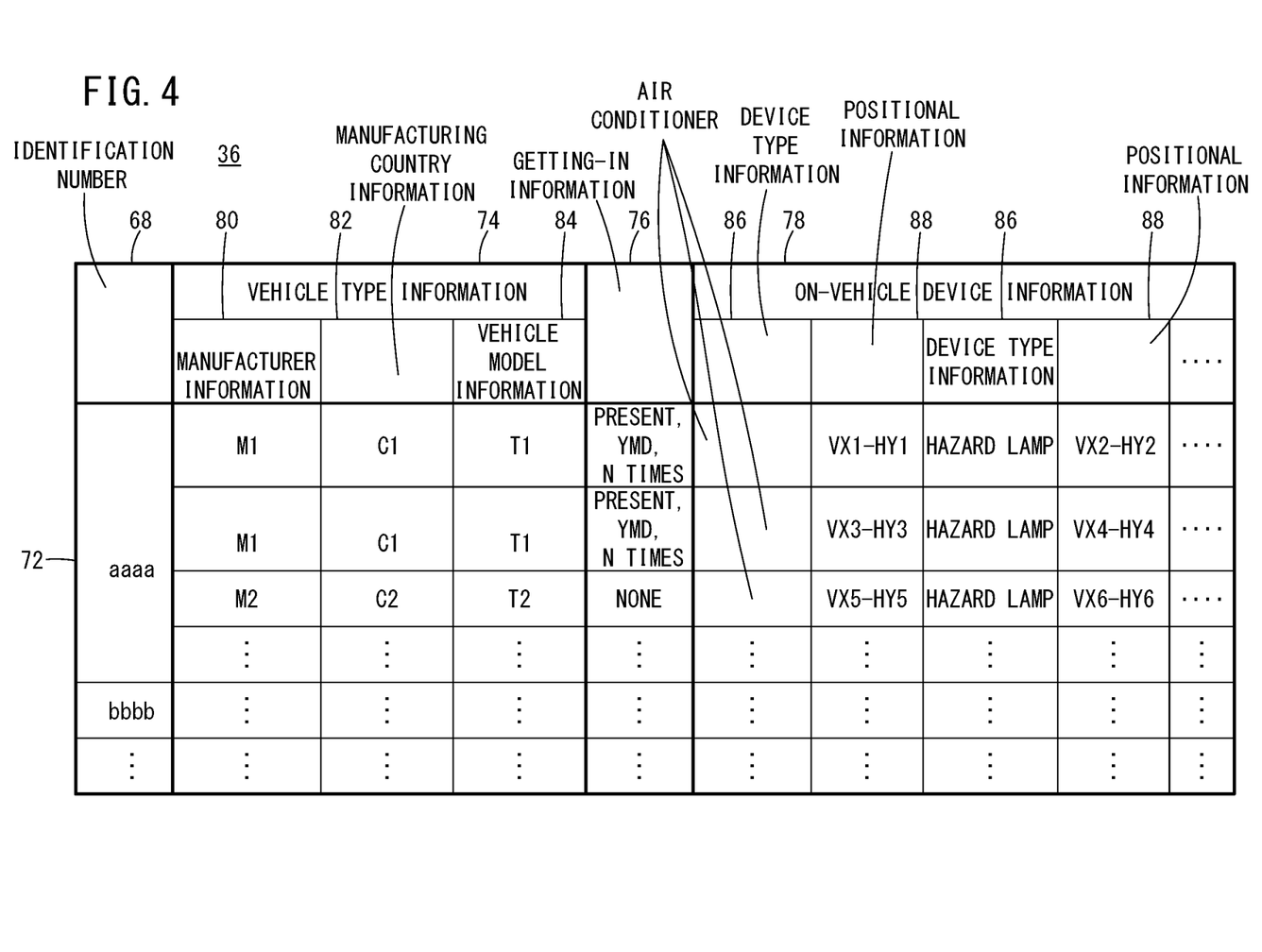
FIG. 4 illustrates occupant-vehicle information stored in an occupant and on-vehicle device DB.

The occupant and on-vehicle device DB 36 stores occupant-vehicle information 72 shown in FIG. 4. The occupant-vehicle information 72 has the identification number 68 of the vehicle occupant, vehicle type information 74, getting-in information 76, and on-vehicle device information 78 associated with one another. The vehicle type information 74 is information regarding the vehicle (including first vehicle 10 and second vehicle 110). The vehicle type information 74 includes manufacturer information 80 that expresses a manufacturer (manufacturing company) of the vehicle, manufacturing country information 82 that expresses a manufacturing country of the vehicle, and vehicle model information 84 that expresses a model of the vehicle. The getting-in information 76 expresses whether the vehicle occupant has ever gotten in the vehicle. Moreover, the getting-in information 76 includes information that expresses the latest getting-in date and time, the getting-in number of times, and the like in addition to the information expressing whether the vehicle occupant has ever gotten in the vehicle. The on-vehicle device information 78 is information regarding the on-vehicle device 20. The on-vehicle device information 78 includes device type information 86 that expresses the type of the on-vehicle device 20, and positional information 88 that expresses a relative position where the operation unit 38 of the on-vehicle device 20 is disposed in the vehicle.

Note that the recording unit 25 records the vehicle type information 74 of the vehicle itself (here, the first vehicle 10) in addition to the occupant and on-vehicle device DB 36.

Back to FIG. 1, the description is continued. The on-vehicle device 20 includes an air conditioner device 40, a hazard lamp device 42, a wiper device 44, a notification device 46, and the like. The air conditioner device 40 includes a main body that sends cool or hot air in the vehicle, an air conditioner ECU that controls the main body, and an air conditioner switch 48 (operation unit 38). The air conditioner device 40 is started or stopped, or a temperature setting is changed in accordance with a vehicle occupant's operation of the air conditioner switch 48 or an operation instruction that is output from the operation assistance device 18. The hazard lamp device 42 includes a lamp, a hazard circuit, a hazard control unit that performs energization control of the hazard circuit, and a hazard switch 50 (operation unit 38). The hazard lamp device 42 is started or stopped in accordance with the vehicle occupant's operation of the hazard switch 50 or the operation instruction that is output from the operation assistance device 18. The wiper device 44 includes a wiper arm, a wiper circuit including a motor that drives the wiper arm, a wiper control unit that performs the energization control of the wiper circuit, and a wiper switch 52 (operation unit 38). The wiper device 44 is started or stopped in accordance with the vehicle occupant's operation of the wiper switch 52 or the operation instruction that is output from the operation assistance device 18. The notification device 46 includes a display device 54 that provides the vehicle occupant with visual information, and an audio device 56 that provides the vehicle occupant with voice information.

[1.2. Server 102]

The server 102 is provided inside a facility of a system administrator of services such as renting cars. The server 102 includes a server-side recording unit 104. The server-side recording unit 104 records the personal information 66 (FIG. 3) of each vehicle occupant and the occupant-vehicle information 72 (FIG. 4). The personal information 66 and the occupant-vehicle information 72 are registered in the server-side recording unit 104 when an operator or the like for the system administrator operates an input device.

[2. Operation of Operation Assistance Device 18]

[2.1. Main Process]

A main process performed by the operation assistance device 18 is described with reference to FIG. 5.

In step S1, the control unit 30 transmits to the server 102 through the communication device 16 at a predetermined timing, a request for sending the personal information 66 and the occupant-vehicle information 72. The control unit 30 outputs an instruction for requesting each piece of the information (personal information 66 and occupant-vehicle information 72). For example, this output is triggered by a change of a power source from OFF to ON through an operation of an ignition switch (not shown) or a start switch (not shown) of the first vehicle 10. The communication device 16 transmits the request instruction to the server 102, downloads the personal information 66 and the occupant-vehicle information 72 from the server 102, and stores the downloaded information in the recording unit 25.

In step S2, the vehicle occupant recognition unit 26 acquires the identification information 70 that is detected by the identification information sensor 14.

In step S3, the vehicle occupant recognition unit 26 compares the acquired identification information 70 with the identification information 70 of the personal information 66 that is recorded in the individual identification DB 34. Then, if the identification information 70 in the individual identification DB 34 is present that matches or resembles the acquired identification information 70, the vehicle occupant recognition unit 26 identifies the vehicle occupant in the first vehicle 10 as the vehicle occupant specified by the identification number 68 that is associated with the identification information 70.

If the vehicle occupant can be identified in step S3 (step S4: YES), the process advances to step S5. On the other hand, if the vehicle occupant cannot be identified in step S3 (step S4: NO), the main process ends.

Figure 6:
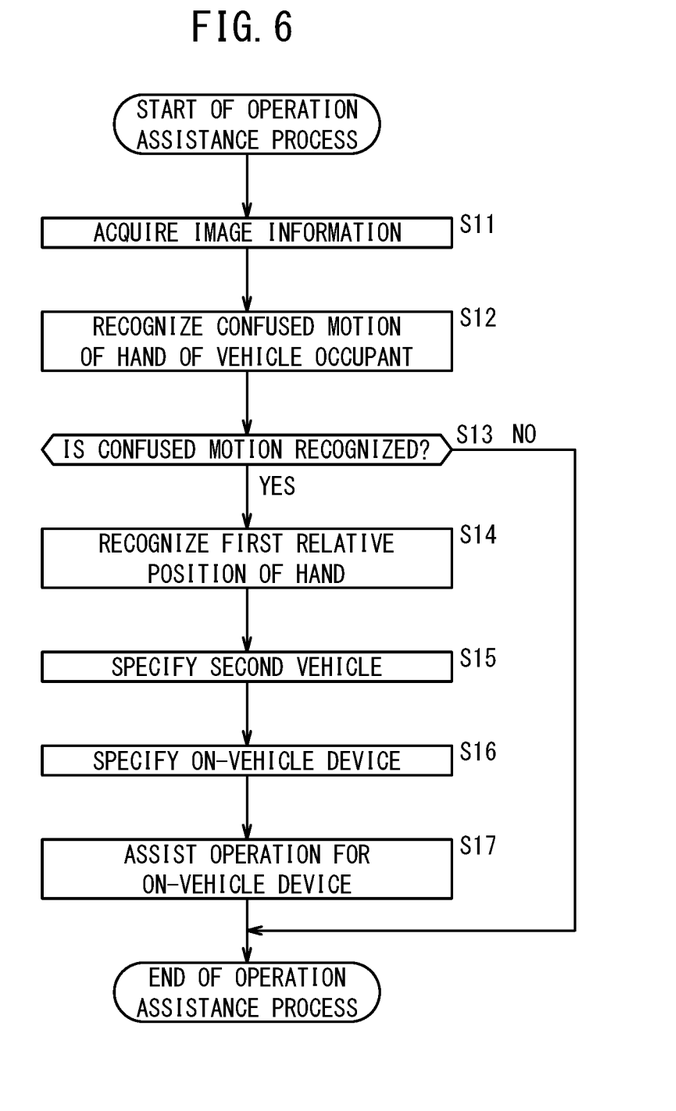
FIG. 6 is a flowchart of an operation assistance process that is performed by the operation assistance device.

When the process has advanced from step S4 to step S5, an operation assistance process shown in FIG. 6 is performed. If the power source of the first vehicle 10 is ON (step S6: YES), the operation assistance process in step S5 is repeatedly performed. If the power source of the first vehicle 10 is turned off (step S6: NO), the operation assistance process ends. The end of the operation assistance process means the end of the main process.

[2.2. Operation Assistance Process]

Figure 5:
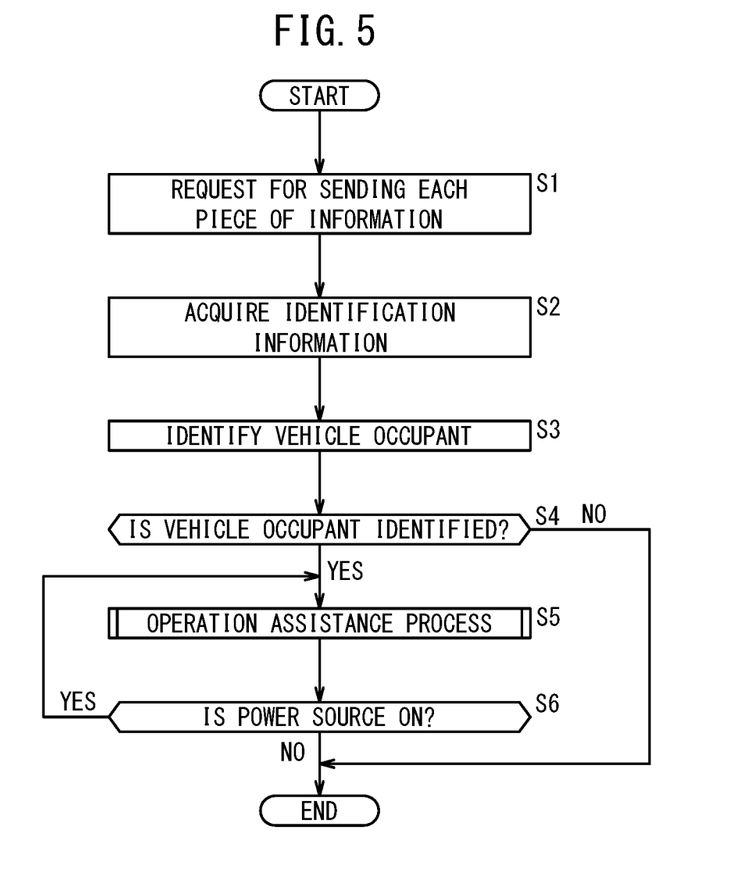
FIG. 5 is a flowchart of a main process that is performed by an operation assistance device.

The operation assistance process performed in step S5 in FIG. 5 is described with reference to FIG. 6.

In step S11, the motion recognition unit 27 and the position recognition unit 28 acquire the image information that is output from the camera 12.

In step S12, the motion recognition unit 27 recognizes a predetermined motion of a hand H of the vehicle occupant by performing a known image recognition process with the image information. The motion recognition unit 27 recognizes, as the predetermined motion, a motion that is identified as a state where the vehicle occupant is confused about the operation, for example, a slight and quick motion (or motions) of the hand H of the vehicle occupant (FIG. 7A). In the present specification, the slight and quick motion of the hand H is also referred to as a confused motion of the hand H. The motion recognition unit 27 can recognize that the hand H of the vehicle occupant does the confused motion by using a known gesture recognition technique (for example, the technique in Japanese Laid-Open Patent Publication No. 2014-174776). Alternatively, if the motion recognition unit 27 recognizes that the hand H of the vehicle occupant repeatedly does the same motion or movement in a predetermined range within a predetermined time, the motion recognition unit 27 recognizes that the hand H does the confused motion. In this state in the present embodiment, it is assumed that the vehicle occupant, who has gotten in the first vehicle 10, misunderstands that he/she is in the second vehicle 110 and tries to operate the switch.

If the motion recognition unit 27 recognizes the confused motion of the hand H (step S13: YES), the process advances to step S14. On the other hand, if the motion recognition unit 27 does not recognize the confused motion of the hand H (step S13: NO), the operation assistance process ends.

When the process has advanced from step S13 to step S14, the position recognition unit 28 recognizes a relative position of the hand H with respect to the first vehicle 10 on the basis of the image information and the coordinate information 32. This relative position is referred to as a first relative position 90. For example, in a situation illustrated in FIG. 7A, the position recognition unit 28 recognizes that the first relative position 90 of the hand H is the coordinate positions V2-H2, V3-H2.

In step S15, the specifying unit 29 specifies the second vehicle 110 in which the vehicle occupant seems to misunderstand that he/she has gotten. Here, the specifying unit 29 searches the occupant and on-vehicle device DB 36 by using the identification number 68 of the vehicle occupant that is identified in step S2, and extracts the occupant-vehicle information 72 with the matched identification number 68. The specifying unit 29 specifies the second vehicle 110 on the basis of the vehicle type information 74 that is included in the extracted occupant-vehicle information 72.

At this time, if there is only one piece of the extracted occupant-vehicle information 72, the specifying unit 29 uses the extracted occupant-vehicle information 72. On the other hand, if there are a plurality of pieces of the extracted occupant-vehicle information 72, the specifying unit 29 selects one piece of the occupant-vehicle information 72. At this time, the specifying unit 29 selects the occupant-vehicle information 72 in which at least one piece of information in the vehicle type information 74 is different from that in the vehicle type information 74 of the first vehicle 10. The specifying unit 29 preferably selects the occupant-vehicle information 72 in which the getting-in information 76 is "PRESENT". Even in this case, if the plurality of pieces of the occupant-vehicle information 72 are still selected, the control unit 30 selects one piece of the occupant-vehicle information 72 on the basis of a predetermined rule. For example, the priority is set in advance, among the manufacturer information 80, the manufacturing country information 82, the vehicle model information 84, and the getting-in information 76 included in the vehicle type information 74. Then, a comparison result of the information with high priority is used preferentially. Alternatively, the occupant-vehicle information 72 whose getting-in date and time of the getting-in information 76 is the latest, or the occupant-vehicle information 72 whose getting-in number of times is the largest is selected. Needless to say, if the vehicle type information 74 included in the occupant-vehicle information 72 and the vehicle type information 74 of the first vehicle 10 match, the specifying unit 29 does not use the occupant-vehicle information 72. This is because the occupant-vehicle information 72 is the information regarding the first vehicle 10 in which the vehicle occupant gets.

In step S16, the specifying unit 29 specifies the on-vehicle device 20 (first on-vehicle device) of the first vehicle 10 that is assumed to be operated by the vehicle occupant. Here, the specifying unit 29 specifies the on-vehicle device 20 (second on-vehicle device) of the second vehicle 110 that is operated by using the operation unit 38 of the second vehicle 110 provided at a second relative position 92 that is a relative position with respect to the second vehicle 110 and corresponds to the first relative position 90, on the basis of the occupant-vehicle information 72 recorded in the recording unit 25. Specifically, the specifying unit 29 compares the first relative position 90 that is recognized by the position recognition unit 28 in step S14 with the positional information 88 that is included in the occupant-vehicle information 72 of the second vehicle 110 specified in step S15. Then, if the matching positional information 88 is present, the specifying unit 29 specifies the on-vehicle device 20 (first on-vehicle device) of the first vehicle 10 including a function common with that of the on-vehicle device 20 (second on-vehicle device) that is associated with the positional information 88. For example, as illustrated in FIG. 7B, at the second relative positions 92 (coordinate positions V2-H2, V3-H2) corresponding to the first relative positions 90 (coordinate positions V2-H2, V3-H2), the air conditioner switch 48 (operation unit 38) of the air conditioner device 40 is disposed. In this case, the specifying unit 29 specifies that the on-vehicle device 20 of the second vehicle 110 that is operated by using the air conditioner switch 48 is the air conditioner device 40. Then, the specifying unit 29 specifies that the on-vehicle device 20 of the first vehicle 10 including the function common with that of the on-vehicle device 20 of the second vehicle 110, that is, the air conditioner device 40 is the on-vehicle device 20 to be operated by the vehicle occupant.

In step S17, the control unit 30 assists the operation for the on-vehicle device 20. For example, the control unit 30 outputs a notification instruction to the notification device 46. The notification device 46 informs the vehicle occupant, of the first relative position 90 of the operation unit 38 of the on-vehicle device 20 (first on-vehicle device) through an image or voice sound. Alternatively, the control unit 30 inquires of the vehicle occupant about the start, the stop, or the like of the on-vehicle device 20, and controls the start, the stop, or the like of the on-vehicle device 20 in accordance with a response from the vehicle occupant such as his/her voice.

[3. Modifications]

The present invention employs various modifications in addition to the above embodiment.

In the above embodiment, it is assumed that the first vehicle 10 is the vehicle used as the rental car or in the car sharing service, the company-owned vehicle, the public vehicle, or the like. However, the first vehicle 10 may be a personally owned vehicle. In this case, the recording unit 25 may record the personal information 66 of a particular vehicle occupant in advance, and the process in step S3 (identifying vehicle occupant) and step S4 (determining whether identification can be performed) in FIG. 5 may be omitted. Moreover, the recording unit 25 may record the occupant-vehicle information 72 corresponding to the particular vehicle occupant in advance, and the process in step S1 (requesting transmission of various pieces of information) and step S2 (acquiring identification information 70) in FIG. 5 may be omitted.

In the above embodiment, the calculation unit 24 of the operation assistance device 18 included in the first vehicle 10 functions as the specifying unit 29. Alternatively, a processor outside the first vehicle 10, for example, a processor that is provided for the server 102 may function as the specifying unit 29. Moreover, the coordinate information 32 and the occupant and on-vehicle device DB 36 may be recorded in the server-side recording unit 104.

In the operation assistance process in this case, if the position recognition unit 28 recognizes the first relative position 90, the information of the first relative position 90 is transmitted to the server 102 from the first vehicle 10. In addition, if the specifying unit 29 of the server 102 specifies the on-vehicle device 20 (first on-vehicle device) that the vehicle occupant tries to operate, the information of the on-vehicle device 20 is transmitted to the first vehicle 10 from the server 102.

In step S16 in FIG. 6, if the on-vehicle device 20 cannot be specified, the process may return to step S15 in order to specify another second vehicle 110.

[4. Invention Obtained by Embodiment]

The invention that can be understood by the above embodiment and the modifications is described below.

The present invention is the operation assistance system 200 configured to assist the operation for the first on-vehicle device 20 of the first vehicle 10, and the operation assistance system 200 includes: the motion recognition unit 27 configured to recognize the predetermined motion of the hand of the vehicle occupant in the first vehicle 10; the position recognition unit 28 configured to recognize the first relative position 90 corresponding to the relative position of the hand H of the vehicle occupant with respect to the first vehicle 10; the recording unit 25 (occupant and on-vehicle device DB 36) configured to record the relative position of the operation unit 38 of the second vehicle 110 with respect to the second vehicle 110, and the second on-vehicle device 20 of the second vehicle 110 that is operated by using the operation unit 38, while associating the relative position with the second on-vehicle device 20; the specifying unit 29 configured to specify the second on-vehicle device (on-vehicle device 20) of the second vehicle 110 that is operated by using the operation unit 38 of the second vehicle 110 provided at the second relative position 92, on the basis of the record in the recording unit 25, the second relative position 92 being the relative position with respect to the second vehicle 110 and corresponding to the first relative position 90; and the control unit 30 configured to assist the operation for the first on-vehicle device (on-vehicle device 20) of the first vehicle 10, the first on-vehicle device including the function common with that of the second on-vehicle device.

By the above configuration, the motion of the hand H performed when the vehicle occupant is confused about the operation of the operation unit 38 is recognized, the on-vehicle device 20 corresponding to the control target is specified on the basis of the relative position of the hand H, and the operation for this on-vehicle device 20 is assisted. Thus, the operation for the on-vehicle device 20 can be assisted appropriately when the vehicle occupant is confused about the switch operation.

In the present invention, the motion recognition unit 27 may be configured to recognize as the predetermined motion, the motion that is identified as the state where the vehicle occupant is confused about the operation; and if the motion recognition unit 27 recognizes the motion identified as the state where the vehicle occupant is confused about the operation, the control unit 30 may be configured to assist the operation for the first on-vehicle device (on-vehicle device 20).

In the present invention, the recording unit 25 may be configured to, regarding the second vehicle 110 in which the vehicle occupant has gotten before, record the relative position of the operation unit 38 of the second vehicle 110 with respect to the second vehicle 110, and the second on-vehicle device 20 of the second vehicle 110 that is operated by using the operation unit 38, while associating the relative position with the second on-vehicle device 20.

The vehicle occupant, who is currently in the first vehicle 10, may misunderstand that he/she is in the second vehicle 110 in which the vehicle occupant has gotten before. By the above configuration, the on-vehicle device 20 is specified on the basis of the device type information 86 that is associated with the getting-in information 76 that expresses that the vehicle occupant has gotten in the vehicle before. Thus, the appropriate on-vehicle device 20 can be specified and the operation can be assisted.

In the present invention, the recording unit 25 may be configured to, regarding the second vehicle 110 in which the vehicle occupant has gotten before, record the vehicle type information 74 corresponding to at least one piece of the manufacturer information 80 that expresses the manufacturer of the second vehicle 110, the manufacturing country information 82 that expresses the manufacturing country of the second vehicle 110, and the vehicle model information 84 that expresses the model of the second vehicle 110, while associating the vehicle type information 74 with the vehicle occupant; and if at least the part of the vehicle type information 74 of the first vehicle 10 does not match the vehicle type information 74 of the second vehicle in which the vehicle occupant has gotten before, the control unit 30 may be configured to assist the operation for the first on-vehicle device (on-vehicle device 20).

If at least one item among the manufacturer, the manufacturing country, and the model, is different between the first vehicle 10 and the second vehicle 110, the relative position of the operation unit 38 is different. By the above configuration, the on-vehicle device 20 is specified on the basis of the device type information 86 that is associated with the manufacturer information 80, the manufacturing country information 82, and the vehicle model information 84. Thus, the appropriate on-vehicle device 20 can be specified and the operation can be assisted.

In the present invention, the first on-vehicle device (on-vehicle device 20) and the second on-vehicle device (on-vehicle device 20) are at least one of the air conditioner device 40, the hazard lamp device 42, and the wiper device 44.

By the above configuration, the operation for the air conditioner device 40, the hazard lamp device 42, and the wiper device 44 can be assisted.

The present invention is the operation assistance method for assisting the operation for the first on-vehicle device 20 of the first vehicle 10, and the operation assistance method includes: the step of, by the recording unit 25, recording the relative position of the operation unit 38 of the second vehicle 110 with respect to the second vehicle 110, and the second on-vehicle device 20 of the second vehicle 110 that is operated by using the operation unit 38, while associating the relative position with the second on-vehicle device 20; the motion recognition step (step S12) of, by the calculation unit 24, recognizing the predetermined motion of the hand H of the vehicle occupant in the first vehicle 10; the position recognition step (step S14) of, by the calculation unit 24, recognizing the first relative position 90 corresponding to the relative position of the hand H of the vehicle occupant with respect to the first vehicle 10; the specifying step (step S15, step S16) of, by the calculation unit 24, specifying the second on-vehicle device (on-vehicle device 20) of the second vehicle 110 that is operated by using the operation unit 38 of the second vehicle 110 provided at the second relative position 92, on the basis of the record in the recording unit 25, the second relative position 92 being the relative position with respect to the second vehicle 110 and corresponding to the first relative position 90; and the control step (step S17) of, by the calculation unit 24, assisting the operation for the first on-vehicle device (on-vehicle device 20) of the first vehicle 10, the first on-vehicle device including the function common with that of the second on-vehicle device (on-vehicle device 20).

By the above configuration, the motion of the hand H performed when the vehicle occupant is confused about the operation of the operation unit 38 is recognized, the on-vehicle device 20 corresponding to the control target is specified on the basis of the relative position of the hand H, and the operation for this on-vehicle device 20 is assisted. Thus, the operation for the on-vehicle device 20 can be assisted appropriately when the vehicle occupant is confused about the switch operation.

Note that the operation assistance system and the operation assistance method according to the present invention are not limited to the above embodiment, and can employ various configurations without departing from the concept of the present invention.

What is claimed is:

1. An operation assistance system configured to assist an operation for a first on-vehicle device of a first vehicle, the operation assistance system comprising:

a motion recognition unit configured to recognize a predetermined motion of a hand of a vehicle occupant in the first vehicle;

a position recognition unit configured to recognize a first relative position corresponding to a relative position of the hand of the vehicle occupant with respect to the first vehicle;

a recording unit configured to record a relative position of an operation unit of a second vehicle with respect to the second vehicle, and a second on-vehicle device of the second vehicle that is operated by using the operation unit, while associating the relative position with the second on-vehicle device;

a specifying unit configured to specify the second on-vehicle device of the second vehicle that is operated by using the operation unit of the second vehicle provided at a second relative position on a basis of a record in the recording unit, the second relative position being a relative position with respect to the second vehicle and corresponding to the first relative position; and a control unit configured to assist the operation for the first on-vehicle device of the first vehicle, the first on-vehicle device including a function common with that of the second on-vehicle device.

2. The operation assistance system according to claim 1, wherein:

the motion recognition unit is configured to recognize as the predetermined motion, a motion that is identified as a state where the vehicle occupant is confused about the operation; and if the motion recognition unit recognizes the motion identified as the state where the vehicle occupant is confused about the operation, the control unit is configured to assist the operation for the first on-vehicle device.

3. The operation assistance system according to claim 1, wherein the vehicle occupant has previously occupied the second vehicle, and the recording unit is configured to record the relative position of the operation unit of the second vehicle with respect to the second vehicle, and the second on-vehicle device of the second vehicle that is operated by using the operation unit, while associating the relative position with the second on-vehicle device.

4. The operation assistance system according to claim 1, wherein the vehicle occupant has previously occupied the second vehicle, the recording unit is configured to record vehicle type information corresponding to at least one piece of manufacturer information that expresses a manufacturer of the second vehicle, manufacturing country information that expresses a manufacturing country of the second vehicle, and vehicle model information that expresses a model of the second vehicle, while associating the vehicle type information with the vehicle occupant; and if at least a part of vehicle type information of the first vehicle does not match the vehicle type information of the second vehicle, the control unit is configured to assist the operation for the first on-vehicle device.

5. The operation assistance system according to claim 1, wherein the first on-vehicle device and the second on-vehicle device are at least one of an air conditioner device, a hazard lamp device, and a wiper device.

6. An operation assistance method for assisting an operation for a first on-vehicle device of a first vehicle, the operation assistance method comprising:

a step of, by a recording unit, recording a relative position of an operation unit of a second vehicle with respect to the second vehicle, and a second on-vehicle device of the second vehicle that is operated by using the operation unit, while associating the relative position with the second on-vehicle device;

a motion recognition step of, by a calculation unit, recognizing a predetermined motion of a hand of a vehicle occupant in the first vehicle;

a position recognition step of, by the calculation unit, recognizing a first relative position corresponding to a relative position of the hand of the vehicle occupant with respect to the first vehicle;

a specifying step of, by the calculation unit, specifying the second on-vehicle device of the second vehicle that is operated by using the operation unit of the second vehicle provided at a second relative position, on a basis of a record in the recording unit, the second relative position being a relative position with respect to the second vehicle and corresponding to the first relative position; and a control step of, by the calculation unit, assisting the operation for the first on-vehicle device of the first vehicle, the first on-vehicle device including a function common with that of the second on-vehicle device.

* * * * *